United States Patent [19]

Warren

[11] 4,218,262

[45] Aug. 19, 1980

[54] NONCLUMPING, DELAYED ACTION VISCOSITY INCREASING AGENT

[75] Inventor: Charlotte L. Warren, Tuxedo Park, N.Y.

[73] Assignee: Balchem Corporation, State Hill, N.Y.

[21] Appl. No.: 956,850

[22] Filed: Nov. 2, 1978

[51] Int. Cl.² ............................................... C08L 5/00
[52] U.S. Cl. .................................... 106/206; 106/208
[58] Field of Search ................... 252/384, 385, 363.5; 106/212, 206, 208, 211

[56] References Cited

U.S. PATENT DOCUMENTS

| | | | |
|---|---|---|---|
| 3,503,895 | 3/1970 | Whelan | 106/181 |
| 3,657,182 | 4/1972 | Jolly | 252/385 |
| 4,105,461 | 8/1978 | Racciato | 106/205 |

*Primary Examiner*—Theodore Morris
*Attorney, Agent, or Firm*—Schuyler, Birch, McKie & Beckett

[57] ABSTRACT

A nonclumping, delayed action viscosity increasing agent comprising core particles of xanthan gum and an encapsulating coating of a fat derivative selected from the group consisting of fatty acids and mono and diglycerides of fatty acids and a surfactant wherein the coating has a hydrophilic/lipophilic balance from 3.5 to 10. Methods of forming the encapsulated particles are also disclosed.

20 Claims, No Drawings

4,218,262

NONCLUMPING, DELAYED ACTION VISCOSITY INCREASING AGENT

BACKGROUND OF THE INVENTION

This invention relates to viscosity increasing agents. More particularly, this invention relates to gum particles usable as thickeners, gel forming agents or suspending agents.

Xanthan gums are well known thickeners or gel forming agents. See, for example, Jordan, U.S. Pat. No. 3,748,201; Sullivan, U.S. Pat. No. 3,944,427; Karl, U.S. Pat. No. 4,038,206; Gunn, U.S. Pat. No. 4,052,231 and Germino, U.S. Pat. No. 4,059,458. Difficulties have been encountered in utilizing gum particles to thicken or gel aqueous media. Uniform distribution of the agent throughout the medium is ordinarily desired. However, when the gum particles are added to an aqueous medium, the particles may start to set or gel at the point of addition before they have been uniformly dispersed throughout the entire medium. Even if gelation does not occur at the point of addition, the added gum particles often agglomerate or form clumps which will not dissolve as intended in the medium. High shear mixing for extending periods has been required to disperse the thickener throughout the medium, and even that has not always proved satisfactory.

Various types of approaches have been attempted in order to overcome such problems including coating the gum particles with highly soluble protective coats. For example, Rigler in his U.S. Pat. No. 3,928,252 teaches incorporating a bicarbonate and an organic acid which will react to form carbon dioxide in a thickening material in order to prevent clumping of the material upon addition to an aqueous medium. Gukenberger, U.S. Pat. No. 3,850,838 teaches agglomeration of gum thickner particles with a carbohydrate binder such as sucrose, dextrose or corn syrup solids in order to improve the dispersability of the particles in an aqueous media. Similarly, Sprayberry in his U.S. Pat. No. 3,551,133 discloses coating gum particles with molasses in order to improve dispersability and prevent clumping. Procedures such as these leave somewhat to be desired because the materials with which the gum particles are treated may not be acceptable in compositions where it is desired to use the gum particles, particularly in food compositions where taste considerations are paramount or in low calorie food preparations.

Insoluble or sparingly soluble fat derivatives have been utilized in compositions for coating highly soluble hygroscopic salts in order to retard take-up of atmospheric moisture and consequent caking of the salts. See: Kell, U.S. Pat. No. 2,175,083; Strashun, U.S. Pat. No. 2,557,155; Otrahalek, U.S. Pat. No. 3,301,636; Allan, U.S. Pat. No. 3,082,154 and Block, U.S. Pat. No. 1,793,420. It has also been known in the art to use surfactants to enhance the solubility of various water-soluble materials. See: Jolly, U.S. Pat. No. 3,657,182 and Procyk, U.S. Pat. No. 3,755,529.

Despite all the efforts of the prior art, there has remained a need for a delayed action viscosity increasing agent which would also be nonclumping.

OBJECTS OF THE INVENTION

It is an object of the present invention to provide a particulate viscosity increasing agent which exhibits a slightly delayed action when added to an aqueous medium.

Another object of the present invention is to provide a particulate viscosity increasing agent which will dissolve completely within 24 hours when added to aqueous medium at ordinary ambient temperatures.

Yet another object of the present invention is to provide a particulate viscosity increasing agent which does not clump or agglomerate when added to aqueous medium.

A further object of the present invention is to provide a particulate viscosity increasing agent which does not require high shear mixing for dispersion in aqueous medium.

Another object of the present invention is to provide a particulate viscosity increasing agent which is readily dispersed in aqueous medium.

It is also an object of the present invention to provide a particulate viscosity increasing agent which is not subject to premature gelation when added to aqueous medium.

It is also an object of the present invention to provide a particulate viscosity increasing agent which is especially suitable for use in food compositions.

Another object of the present invention is to provide a particulate viscosity increasing agent which does not impart any undesirable color, odor or taste to food compositions.

It is also an object of the present invention to provide a nontoxic particulate viscosity increasing agent.

Still another object of the invention is to provide a method for manufacturing a particulate viscosity increasing agent.

SUMMARY OF THE INVENTION

These and other objects of the invention are achieved by providing a nonclumping, delayed action viscosity increasing agent comprising
 (a) from 90 to 10% core particles of xanthan gum and
 (b) from 10 to 90% encapsulating coating on said particles comprising:
  (i) from 90 to 99.5% of a fat derivative selected from the group consisting of fatty acids having from 12 to 22 carbon atoms, monoglycerides of fatty acids having from 12 to 22 carbon atoms, diglycerides of fatty acids having from 12 to 22 carbon atoms and mixtures thereof; and
  (ii) from 0.5 to 10% of a surfactant;
 said coating having a hydrophilic/lipophilic balance from 3.5 to 10.

In a further aspect the invention comprises a method of producing a nonclumping, delayed action viscosity increasing agent comprising coating xanthan gum particles with an encapsulating coating comprising:
 (i) 90 to 99.5% of a fat derivative selected from the group consisting of fatty acids having from 12 to 22 carbon atoms, monoglycerides of fatty acids having from 12 to 22 carbon atoms, diglycerides of fatty acids having 12 to 22 carbon atoms and mixtures thereof; and
 (ii) 0.5 to 10% of a surfactant;
said coating having a hydrophilic/lipophilic balance from 3.5 to 10.

DESCRIPTION OF THE PREFERRED EMBODIMENT

Xanthan gum particles usable as core particles in the present invention are commercially available from numerous sources. The gum is produced by the action of bacteria of the genus xanthomonas, e.g., *Xanthomonas campestris*. Desirably the gum particles will have a minimum particle size of 325 mesh and a maximum particle size of 20 mesh. Suitably, the average particle size will range from 140 to 200 mesh.

The fat derivative may be a fatty acid having from 12 to 22 carbon atoms, a monoglyceride of a fatty acid having from 12 to 22 carbon atoms, a diglyceride of a fatty acid having from 12 to 22 carbon atoms or a mixture of the foregoing. Preferably, the fatty acid will be a saturated fatty acid such as lauric acid, palmitic acid or stearic acid in order to avoid the possibility of the material becoming rancid. It has been found that distilled, partially saponified fats are highly suitable. Preferably, the fat derivative will contain at least 30% alpha monoglyceride; most preferably at least 90% alpha monoglyceride. The presence of minor amounts of glycerol and/or alkali metal salts of fatty acids left over from the saponification process is not deleterious as such materials act as beneficial surfactants. The fat derivative should comprise at least 90% of the coating but not more than 99.5% thereof.

The coating must also comprise from 0.5 to 10% of a surfactant. Ionic or nonionic surfactants may be utilized. The surfactant serves to increase the solubility of the coating, to promote wetting of the coated particles when dispersed in aqueous medium and to promote the ultimate dispersion of the thickener particles. Usable surfactants include alkali metal salts of fatty acids, sorbitan fatty acid esters, polyoxyethylene modified sorbitan fatty acid esters, polyethylene glycol monoesters, polypropylene glycol monoesters, linear alcohol ethoxylates, alkyl aryl polyethylene glycol ethers and fatty acid esters of sucrose. Mixtures of the foregoing may be used. The fatty acid component of the surfactant may be any fatty acid having from 12 to 22 carbon atoms including lauric acid; myristic acid; palmitic acid; stearic acid, oleic acid; linoleic acid; linolenic acid, or a mixture thereof. Saturated acids are preferred. Monoesters and triesters of sorbitan are both useful. Polyoxythylene modified monoesters of sorbitan with saturated fatty acids having from 12 to 18 carbon atoms are especially preferred. If the proportion of surfactant in the coating is increased to greater than about 10%, the desirable delayed action properties are not achieved.

Examples of specific surfactant materials include sorbitan monolaurate, sorbitan monostearate, sorbitan monopalmitate, sorbitan monooleate, sorbitan tristearate, sorbitan trioleate, polyoxyethylene sorbitan monolaurate, polyoxyethylene sorbitan monopalmitate, polyoxyethylene sorbitan monostearate, polyoxyethylene sorbitan monooleate, polyoxyethylene sorbitan tristearate, polyoxyethylene sorbitan trioleate, sodium stearate, sodium laurate, sodium palmitate, sodium myristate, sodium oleate, potassium laurate, potassium stearate, potassium oleate, polyethylene glycol monolaurate, polyethylene glycol monostearate, polypropylene glycol monolaurate, polyethylene glycol monobutyl ether, polyethylene glycol monomethyl ether, sucrose monolaurate and other similar materials.

The coating may comprise from 10 to 90% of the thickener particles. Preferably, the coating will constitute from 40 to 75% of the particles, and the gum core the remaining 60 to 25%.

The coating should have a melting point of at least 40° C. Preferably, the melting point of the coating will lie in the range from 45° C. to 80° C.

Importantly, the coating should have a hydrophilic/lipophilic balance (HLB) from 3.5 to 10. This has been found to be crucial in achieving the desired delayed action of the thickening agent and in preventing clumping. Most preferably, the HLB will be from 3.5 to 6.

For food applications, it is of course essential that the coating be nontoxic. Also the coating should be comparatively colorless, odorless and tasteless. The recited fat derivatives achieve these objects when used with FDA approved surfactants.

Gum particles provided with a coating as described hereinabove do not clump when added to aqueous media even when there is little or no agitation of the medium. Similar results are obtained when the coated gum particles are added to an oil in water emulsion.

As previously mentioned, in many applications it is considered needful that there not be an immediate increase in viscosity of the medium as the particles are added, but rather that there be a period of delay before the viscosity increasing action of the gum particles takes place. In contrast with uncoated gum particles or gum particles provided with highly soluble coatings, an aqueous medium to which the coated particles of the present invention are added will show no increase in viscosity in the first several minutes. Tests suggest that the gum particles are prevented from dissolving for at least two or three minutes. Complete release of the gum and maximum increase in viscosity occurs, however, in less than 24 hours at ambient temperatures, i.e., from 10° to 30° C.

The coating can be applied to the particles by a number of techniques. A preferred technique when the proportion of coating to core particle is comparatively low is to dissolve the coating material in a volatile solvent such as ethanol and spray the coating solution onto an agitated bed of gum particles. Conventional pan coating apparatus can be utilized, and the solvent can be removed at reduced pressure. When a higher proportion of coating to core particle is desired, the fat derivative may be heated to a temperature above its melting point after which the surfactant and core particles are mixed into the melted fat derivative and the resulting suspension is spray chilled. In any event, it is desired that a continuous coating be formed over all sides of the gum particle.

The viscosity increasing agent of the present invention may be utilized in a wide variety of applications. It finds ready utilization as a thickener in food compositions such as gravies, salad dressings, bakery fillings, puddings, gelatin desserts, milkshakes, frozen foods, syrups and beverage mixes. It is also highly advantageous as a thickener and suspending agent in pharmaceutical suspensions. Other applications include cosmetics, surface coatings (e.g., paints), printing inks, textile dyes, adhesives, pesticides, ceramics, gelling fluids, as a gelling agent, in photographic emulsions and numerous other uses. Typically, the coated gum particles of the present invention may be added directly to aqueous medium when it is desired to effect an increase in viscosity. Slight agitation may be helpful, but high shear mixing is not required.

The invention will be further explained with reference to the following example.

EXAMPLE

Encapsulated gum particles were prepared according to the present invention comprising 33% core particles of xanthane gum and 67% coating having an HLB of 5.8. The coating comprised 96% distilled monoglyceride of stearic acid, 3% Polysorbate 20 (polyoxyethylene sorbitan monolaurate) and the balance sodium stearate and glycerine and had a melting point of approximately 60° C. 1.75 grams of the coated particles were mixed with 66.1 grams of a proprietary salad dressing mix comprising colors, flavorings, albumin and sugar. The powder mixture was then all added to 90 milliliters of water in a cruet and briefly shaken after which 105 milliliters vegetable oil were added. Following further brief shaking a smooth, stable emulsion had formed. After 15 minutes the viscosity of the mixture was about 2,000 centipoise. After 45 minutes, the viscosity was approximately 4,000 centipoise. Maximum viscosity was achieved after approximately 18 hours at which time the salad dressing was stable, and pourable. No agitation other than light shaking was utilized.

The coated gum particles of the present invention are highly effective viscosity increasing agents which are readily dispersed in aqueous media without premature gelation or clumping and without the need for high shear mixing. The coated particles are readily stored and remain free flowing even after long periods of storage.

I claim:

1. A nonclumping, delayed action viscosity increasing agent comprising
   (a) 90 to 10% core particles of xanthan gum, and
   (b) 10 to 90% encapsulating coating on said particles comprising:
     (i) 90 to 99.5% of a fat derivative selected from the group consisting of fatty acids having from 12 to 22 carbon atoms, monoglycerides of fatty acids having from 12 to 22 carbon atoms, diglycerides of fatty acids having from 12 to 22 carbon atoms and mixtures thereof; and
     (ii) 0.5 to 10% of a surfactant;
   said coating having a hydrophilic/lipophilic balance from 3.5 to 10.

2. A viscosity increasing agent according to claim 1 wherein the hydrophilic/lipophilic balance of said coating is from 3.5 to 6.

3. A viscosity increasing agent according to claim 1 wherein the size of the core particles ranges between 325 and 20 mesh.

4. A viscosity increasing agent according to claim 3 wherein the average size of the core particles lies in the range from 140 mesh to 200 mesh.

5. A viscosity increasing agent according to claim 1 wherein said coating has a melting point of at least 40° C.

6. A viscosity increasing agent according to claim 5 wherein the melting point of the coating lies in the range from 45° C. to 80° C.

7. A viscosity increasing agent according to claim 1 wherein the gum core comprises from 25 to 60% of each particle.

8. A viscosity increasing agent according to claim 1 wherein said fat derivative is selected from the group consisting of saturated fatty acids, monoglycerides of saturated fatty acids, diglycerides of saturated fatty acids and mixtures thereof.

9. A viscosity increasing agent according to claim 8 wherein said fat derivative comprises a mixture of mono and diglycerides of saturated fatty acids having from 12 to 22 carbon atoms.

10. A viscosity increasing agent according to claim 9 wherein said fat derivative comprises at least 30% alpha monoglyceride.

11. A viscosity increasing agent according to claim 10 wherein said fat derivative comprises at least 90% alpha monoglyceride.

12. A viscosity increasing agent according to claim 2 wherein the coating has a retarding effect on the dissolution of the gum particles such that when the coated particles are added to an aqueous medium at a temperature between 10° and 30° C., none of the gum dissolves within a period of two minutes.

13. A viscosity increasing agent according to claim 12 wherein all of the gum core particles dissolve within 24 hours.

14. A viscosity increasing agent according to claim 1 wherein the surfactant is selected from the group consisting of alkali metal salts of fatty acids, sorbitan fatty acid esters, polyoxyethylene modified sorbitan fatty acid esters, polyethylene glycol monoesters, polypropylene glycol monoesters, linear alcohol ethoxylates, alkyl aryl polyethylene glycol ethers, fatty acid esters of sucrose and mixtures thereof.

15. A method of producing a nonclumping, delayed action viscosity increasing agent comprising coating xanthan gum particles with an encapsulating coating comprising
   (i) 90 to 99.5% of a fat derivative selected from the group consisting of fatty acids having from 12 to 22 carbon atoms, monoglycerides of fatty acids having from 12 to 22 carbon atoms, diglycerides of fatty acids having from 12 to 22 carbon atoms and mixtures thereof and
   (ii) 0.5 to 10% of a surfactant;
   said coating having a hydrophilic/lipophilic balance from 3.5 to 10.

16. A method according to claim 15 wherein the hydrophilic/lipophilic balance of said coating is from 3.5 to 6.

17. A method according to claim 15 comprising the steps of melting the fat derivative; mixing the surfactant with the molten fat derivative; suspending the gum particles in the molten fat derivative, and spray chilling the thusly formed suspension to produce encapsulated gum particles.

18. A method according to claim 15 comprising the steps of dissolving the fat derivative and surfactant in a volatile solvent and spraying the resulting solution onto an agitated bed of gum particles to produce encapsulated gum particles.

19. A method as recited in claim 18 wherein said solvent is ethanol.

20. A method according to claim 15 wherein the surfactant is selected from the group consisting of alkali metal salts of fatty acids, sorbitan fatty acid esters, polyoxyethylene modified sorbitan fatty acid esters, polyethylene glycol monoesters, polypropylene glycol monoesters, linear alcohol ethoxylates, alkyl aryl polyethylene glycol ethers, fatty acid esters of sucrose and mixtures thereof.

* * * * *